J. H. WININGER.
ACETYLENE GAS LAMP.
APPLICATION FILED JULY 6, 1914.
1,130,456.
Patented Mar. 2, 1915.
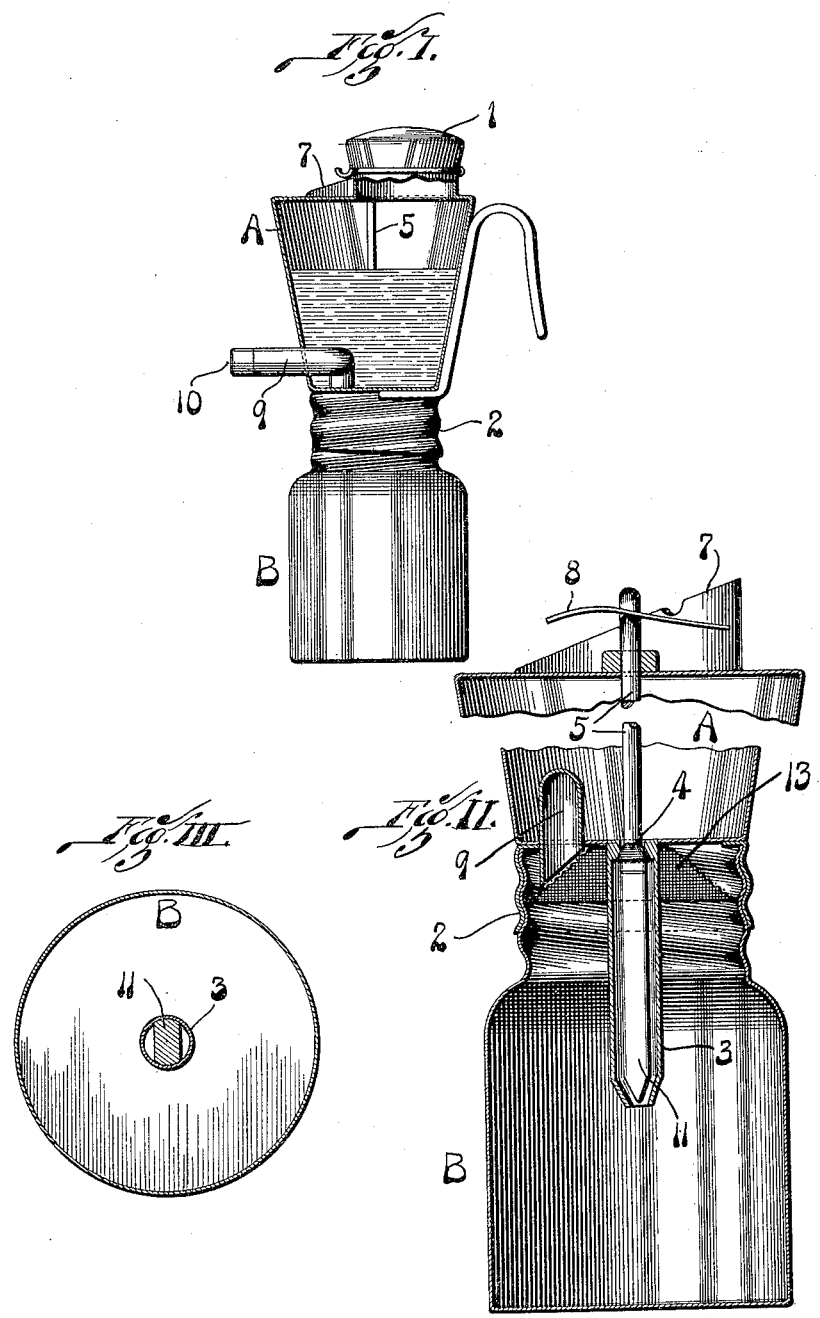

UNITED STATES PATENT OFFICE.

JOHN H. WININGER, OF COLLINSVILLE, ILLINOIS.

ACETYLENE-GAS LAMP.

1,130,456.  Specification of Letters Patent.  Patented Mar. 2, 1915.

Application filed July 6, 1914. Serial No. 849,300.

*To all whom it may concern:*

Be it known that I, JOHN H. WININGER, a citizen of the United States of America, a resident of Collinsville, in the county of Madison, State of Illinois, have invented certain new and useful Improvements in Acetylene-Gas Lamps, of which the following is a full, clear, and exact description, reference being had to the accompanying drawings, forming a part of this specification.

My invention relates to an acetylene gas lamp adapted for use as a miner's lamp.

One of the objects of the invention is to provide a very simple and efficient means for cleaning a water supply tube which leads into the carbid receptacle.

The invention also includes details of construction which will be hereinafter pointed out.

Figure I is a vertical section, partly in elevation. Fig. II is an enlarged vertical section, partly broken away, taken through the center of the carbid receptacle. Fig. III is an enlarged horizontal section taken through the carbid receptacle, showing a water supply tube and a scraper rotatably mounted in said tube.

A designates a water receptacle provided with a closure 1, and B designates a carbid receptacle removably secured to the water receptacle, said carbid receptacle being preferably provided with a screw threaded neck fitting into a socket member 2 secured to the bottom of the water receptacle.

3 designates a water supply tube leading from the water receptacle A and extending into the carbid receptacle B, said tube 3 being provided with a valve seat at its upper end, adapted to be engaged by a valve 4. The valve 4 lies below the valve seat and is secured to a vertically movable valve rod 5 passing through the water receptacle and provided with an operating handle at its upper end. The operating handle is forced downwardly onto a notched cam 7 by means of a spring 8, and it may be rotated on the cam 7 with the result of rotating and opening or closing the valve 4.

9 designates a gas conducting tube arranged partly within the water receptacle, the inner end of said tube 9 being located in the upper portion of the carbid receptacle and the outer end of said tube 9 being provided with a discharge nozzle or burner 10 located at the front of the lamp. When the valve 4 is open, water flows from the water reservoir through the water conducting tube 3 and into the carbid receptacle B where it comes into contact with the carbid, thereby starting the generation of gas which flows out through a gas conducting tube 9 to the burner 10.

The water conducting tube 3 is provided with a rotatable scraper blade 11 secured to the valve 4 and provided with cutting edges which engage the tube 3, the lower end of said scraper blade being tapered and the lower end of the water conducting tube 3 being shaped to receive the tapered portion of the scraper blade. The operating handle at the upper end of rod 5 may be rotated and raised and lowered with the result of imparting a corresponding movement to the scraper blade 11, thereby cleaning the water conducting tube 3 which would otherwise become clogged by the material in the carbid receptacles. It will be noted that the water tube may be very thoroughly cleaned by the vertically movable and rotatable scraper blade 11 so as to completely remove all matter adhering to the inner face of said tube.

The carbid receptacle is provided with a substantially conical screen 13, having a central opening for the reception of the tube 3, and said screen 13 is frictionally engaged with the water tube. The inner end of the gas conducting tube 9 is preferably beveled, as shown in Fig. II, and the screen 13 lies directly below the beveled portion of said tube. The screen 13 is rotatably fitted to the water tube and the axis of rotation is off-set from the lower end of the adjacent gas conducting tube. Hence, when a screen becomes filled with carbid dust at a point below the gas outlet, the screen may, upon the removal of the carbid receptacle, be rotated manually about its axis to move the dust laden portion of the screen away from the gas outlet, thereby exposing a clean portion of the screen to said outlet.

I claim:

1. A lamp comprising a water receptacle, a carbid receptacle arranged below and secured to said water receptacle, a water supply tube leading from the water receptacle into the carbid receptacle, a valve seat being formed at the upper end of said water supply tube, a vertically movable and rotatable valve rod extending through the water receptacle, a valve secured to said valve rod adapted to engage said valve seat, said valve being arranged below said valve seat, and a scraper blade secured to and extending downwardly from said valve, the lower end of said scraper blade being tapered and the lower end of said water supply tube being tapered to receive the lower end of said scraper blade.

2. A lamp comprising a water receptacle, a carbid receptacle, a water supply tube leading from said water receptacle and extending into said carbid receptacle, and a flat scraper blade extending across and rotatably mounted in said water supply tube, said flat scraper blade being provided with a plurality of cutting edges which frictionally engage the inner face of said water supply tube.

3. A lamp comprising a water receptacle, a carbid receptacle arranged below and secured to said water receptacle, a water supply tube leading from the water receptacle into the carbid receptacle, a valve seat being formed at the upper end of said water supply tube, a valve rod extending through the water receptacle, a valve secured to said valve rod adapted to engage said valve seat, and a flat scraper blade secured to and extending downwardly from said valve, said flat scraper blade being arranged within said water supply tube and provided with cutting edges which frictionally engage the inner face of said tube, said valve being arranged below said valve seat to permit a downward movement of the valve and flat scraper blade, and the said valve rod being operable to rotate and to reciprocate said valve and flat scraper blade.

4. A lamp comprising a water receptacle, a carbid receptacle arranged below and secured to said water receptacle, a water supply tube leading from the water receptacle into the carbid receptacle, a valve seat being formed at the upper end of said water supply tube, a vertically movable and rotatable valve rod extending through the water receptacle, a valve secured to said valve rod adapted to engage said valve seat, said valve being arranged below said valve seat, a scraper blade secured to and extending downwardly from said valve, said scraper blade being arranged within said water supply tube, a spring tending to move said valve, valve rod and scraper blade downwardly, an operating handle secured to said valve rod, and an inclined cam to which said operating handle is fitted, said valve being movable to its open position in response to the pressure of said spring and said inclined cam constituting a stop for limiting the movement of said valve.

JOHN H. WININGER.

In the presence of—
M. M. Apgar,
A. J. McCauley.

Copies of this patent may be obtained for five cents each, by addressing the "Commissioner of Patents, Washington, D. C."